United States Patent
Schedl

(10) Patent No.: US 10,094,437 B2
(45) Date of Patent: Oct. 9, 2018

(54) SELF-BRAKING GEAR AND PEOPLE CONVEYOR COMPRISING A SELF-BRAKING GEAR

(71) Applicant: Otis Elevator Company, Farmington, CT (US)

(72) Inventor: Philipp Schedl, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/846,603

(22) Filed: Dec. 19, 2017

(65) Prior Publication Data

US 2018/0172093 A1 Jun. 21, 2018

(30) Foreign Application Priority Data

Dec. 21, 2016 (EP) ..................................... 16205618

(51) Int. Cl.

| | | |
|---|---|---|
| *F16D 59/00* | (2006.01) | |
| *F16D 63/00* | (2006.01) | |
| *F16D 55/02* | (2006.01) | |
| *B66B 21/02* | (2006.01) | |
| *B66B 23/02* | (2006.01) | |
| *F16H 1/28* | (2006.01) | |

(Continued)

(52) U.S. Cl.
CPC .............. *F16D 59/00* (2013.01); *B66B 21/02* (2013.01); *B66B 23/026* (2013.01); *B66B 29/00* (2013.01); *F16D 55/02* (2013.01); *F16D 63/006* (2013.01); *F16H 1/28* (2013.01); *F16H 35/00* (2013.01); *F16H 57/08* (2013.01); *B66B 21/10* (2013.01); *F16D 2121/14* (2013.01); *F16D 2125/50* (2013.01); *F16D 2125/64* (2013.01); *F16D 2127/001* (2013.01); *F16D 2127/005* (2013.01); *F16H 2035/006* (2013.01)

(58) Field of Classification Search
CPC ....... B65B 21/02; B65B 21/026; F16D 59/00; F16D 55/02; F16D 63/006; F16H 1/28; F16H 57/08
USPC .................................................. 198/330, 331
See application file for complete search history.

(56) References Cited

U.S. PATENT DOCUMENTS

| | | | | |
|---|---|---|---|---|
| 1,200,502 A | | 10/1916 | Griffith | |
| 3,630,328 A | * | 12/1971 | Nelson | ................... B64C 13/00 192/223 |

(Continued)

FOREIGN PATENT DOCUMENTS

| | | |
|---|---|---|
| CN | 2509156 Y | 9/2002 |
| CN | 2598972 Y | 1/2004 |

(Continued)

OTHER PUBLICATIONS

European Search Report for application EP 16205618, dated Jun. 21, 2017, 10 pages.

*Primary Examiner* — Joseph A Dillon, Jr.
(74) *Attorney, Agent, or Firm* — Cantor Colburn LLP

(57) ABSTRACT

A self-braking gear (2) comprises: an input shaft (4), an output shaft (6), a braking mechanism (8), which is configured for braking the output shaft (6), and a planetary gear (10). The planetary gear (10), which is connected between the input shaft (4) and the output shaft (6), is configured to activate the braking mechanism (8) in order to brake the output shaft (6), when no torque is provided via the input shaft (4). The self-braking gear (2) may be employed in a people conveyor (50) such as an escalator.

11 Claims, 5 Drawing Sheets

(51) Int. Cl.
  *F16H 35/00* (2006.01)
  *F16H 57/08* (2006.01)
  *B66B 29/00* (2006.01)
  *F16D 121/14* (2012.01)
  *F16D 125/50* (2012.01)
  *F16D 125/64* (2012.01)
  *B66B 21/10* (2006.01)
  *F16D 127/00* (2012.01)

(56) References Cited

U.S. PATENT DOCUMENTS

| | | | | |
|---|---|---|---|---|
| 4,780,785 | A | | 10/1988 | Schabert et al. |
| 5,293,107 | A | * | 3/1994 | Akeel .................... B25J 9/08 310/83 |
| 5,540,306 | A | * | 7/1996 | Teasdale ............... A63B 21/15 188/180 |
| 5,957,804 | A | | 9/1999 | Schulz et al. |
| 6,079,524 | A | * | 6/2000 | Hung ..................... F16D 51/00 187/314 |
| 6,293,100 | B1 | * | 9/2001 | Allart .................... B60T 1/065 60/442 |
| 6,971,496 | B1 | * | 12/2005 | Nurnberg .............. B66B 29/00 198/323 |
| 7,597,182 | B2 | | 10/2009 | Illedits et al. |
| 2002/0175029 | A1 | * | 11/2002 | Saruwatari ............ F16D 55/228 188/72.1 |
| 2014/0031165 | A1 | * | 1/2014 | Kubota .................... F16H 1/28 475/331 |
| 2015/0111685 | A1 | * | 4/2015 | Biermann ............... F16H 48/11 475/248 |
| 2017/0198515 | A1 | * | 7/2017 | Sasaki ................... E05F 15/611 |
| 2018/0045261 | A1 | * | 2/2018 | Ritter ..................... F16D 55/22 |

FOREIGN PATENT DOCUMENTS

| | | |
|---|---|---|
| CN | 1760107 A | 4/2006 |
| CN | 101832367 A | 9/2010 |
| CN | 102653121 A | 9/2012 |
| CN | 102745582 A | 10/2012 |
| CN | 104019190 A | 9/2014 |
| CN | 104747659 A | 7/2015 |
| CN | 205118145 U | 3/2016 |
| DE | 10127676 A1 | 12/2002 |
| DE | 202009010093 U1 | 10/2009 |
| GB | 1202804 A | 8/1970 |
| JP | 2005145603 A | 6/2005 |
| JP | 4961225 B2 | 6/2012 |
| WO | 2012066035 A1 | 5/2012 |
| WO | 2015070462 A1 | 5/2015 |
| WO | 2016154925 A1 | 10/2016 |

* cited by examiner

SELF-BRAKING GEAR AND PEOPLE CONVEYOR COMPRISING A SELF-BRAKING GEAR

The invention relates to a self-braking gear, in particular to a self-braking gear which is configured to be employed in a people conveyor. The invention further relates to a people conveyor comprising such a self-braking gear and to a method of operating such a people conveyor.

A people conveyor such as an escalator or a moving walkway typically comprises a chain of conveyance elements, such as pallets or steps, which are configured for conveying people, and a drive unit, which is configured for driving the chain of conveyance elements. Torque provided by the drive unit is transmitted to the chain of conveyance elements via transmission elements, which in particular may include chains and/or belts.

In particular in configurations in which the chain of conveyance elements extends between different levels of height, such as different floors of a building, there is a risk that the conveyance elements will move downwards in an uncontrolled manner in case the drive unit and/or at least one of the transmission elements fails.

It is desirable to avoid such an uncontrolled movement of the conveyance elements.

According to an exemplary embodiment of the invention a self-braking gear, which in particular may be employed in a people conveyor, comprises an input shaft, which is configured to be connected to a drive unit; an output shaft, which is configured to be connected to a load, such as a chain of conveyance elements; a braking mechanism, which is configured for braking the output shaft; and a planetary gear which is connected between the input shaft and the output shaft. The planetary gear is configured to activate the braking mechanism in order to brake the output shaft when no torque is provided via the input shaft.

A people conveyor according to an exemplary embodiment of the invention comprises a chain of conveyance elements which are configured for conveying people; a drive unit, which is configured for driving the chain of conveyance elements; and a self-braking gear according to an exemplary embodiment of the invention. The drive unit is connected to the input shaft of the self-braking gear and the chain of conveyance elements is connected to the output shaft of the self-braking gear.

A method of operating a people conveyor according to an exemplary embodiment of the invention includes operating the drive unit in order to drive the chain of conveyance elements via the self-braking gear.

A method of operating a people conveyor according to an exemplary embodiment of the invention also includes locking the chain of conveyance elements by means of the self-braking gear when no torque is provided via the input shaft, i.e. when the drive unit is not driving the chain of conveyance elements via the self-braking gear.

A self-braking gear according to an exemplary embodiment of the invention is configured to transmit torque from the input shaft to the output shaft in normal (driving) operation, i.e. when the chain of conveying elements is driven by torque provided by the drive unit.

In case, however, no torque is transmitted to the input shaft of the self-braking gear, e.g. due to a failure of the drive unit or at least one of the transmission elements, the braking mechanism is activated in order to brake the output shaft. Braking the output shaft avoids an uncontrolled and undesirable movement of the chain of conveying elements, which is mechanically connected to the output shaft.

A self-braking gear according to an exemplary embodiment of the invention may be realized in a configuration which may be integrated in a main drive shaft of a sprocket which is provided for driving the chain of conveying elements of a people conveyor. This allows to integrate the self-braking gear into a people conveyor without increasing the space which is necessary for the people conveyor. As a result, a self-braking gear according to an exemplary embodiment of the invention may be added easily to existing people conveyor designs.

In the following, exemplary embodiments of the invention are described in more detail with reference to the enclosed figures.

FIG. 1 shows a schematic side view of a people conveyor according to an exemplary embodiment of the invention.

FIGS. 2 and 3 respectively show a perspective view of a self-braking gear according to an exemplary embodiment of the invention.

Figure 1:
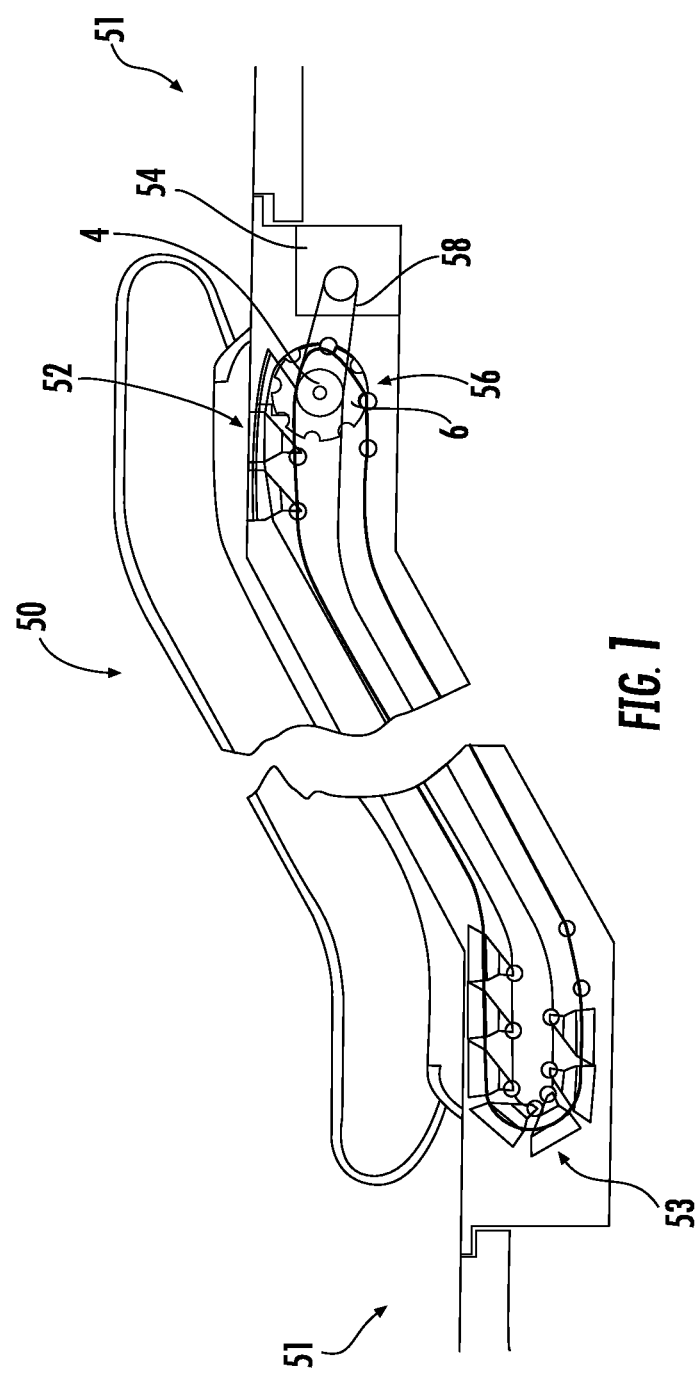

FIG. 1 shows a schematic side view of a people conveyor 50 extending between two landing portions 51. In the embodiment shown in FIG. 1, the people conveyor 50 is an escalator comprising a plurality of steps 53. The skilled person, however, will understand that exemplary embodiments of the invention may include different kinds of people conveyor 50, in particular moving walkways comprising a plurality of pallets instead of steps 53. The steps 53 are arranged as a chain of conveyance elements 52. The chain of conveyance elements 52 is in engagement with a sprocket 56 which is mounted to a rotating shaft 6. A drive unit 54 is configured for driving the rotating shaft 6 and in consequence the sprocket 56 and the chain of conveyance elements 52 via a transmission element 58, which may be a chain or belt.

A self-braking gear 2 according to an exemplary embodiment of the invention, which is not visible in FIG. 1, is arranged within the rotating shaft 6. The self-braking gear 2 will be described in more detail in the following with reference to FIGS. 2 to 8. The rotating shaft 6 in particular may be an output shaft 6 of the self-braking gear 2. The transmission element 58 is connected to an input shaft 4 of the self-braking gear 2. Thus, the torque provided by the drive unit 54 is transmitted via the transmission element 58 to the self-braking gear which transmits the torque via its output shaft 6 to the sprocket 56.

In an alternative configuration, which is not shown in the figures, the input shaft of the self-braking gear 2 may be connected directly to an output shaft of the drive unit 54.

Figure 2:
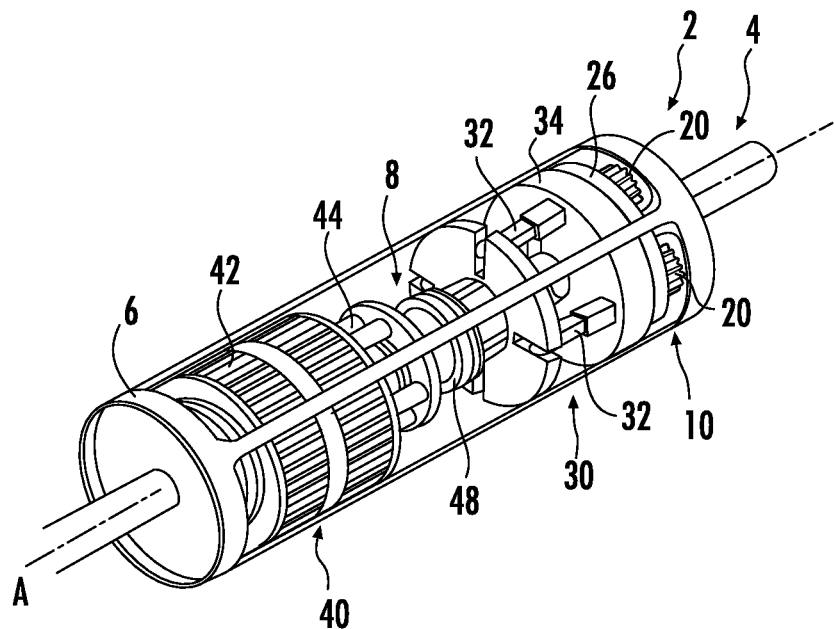
Figure 3:
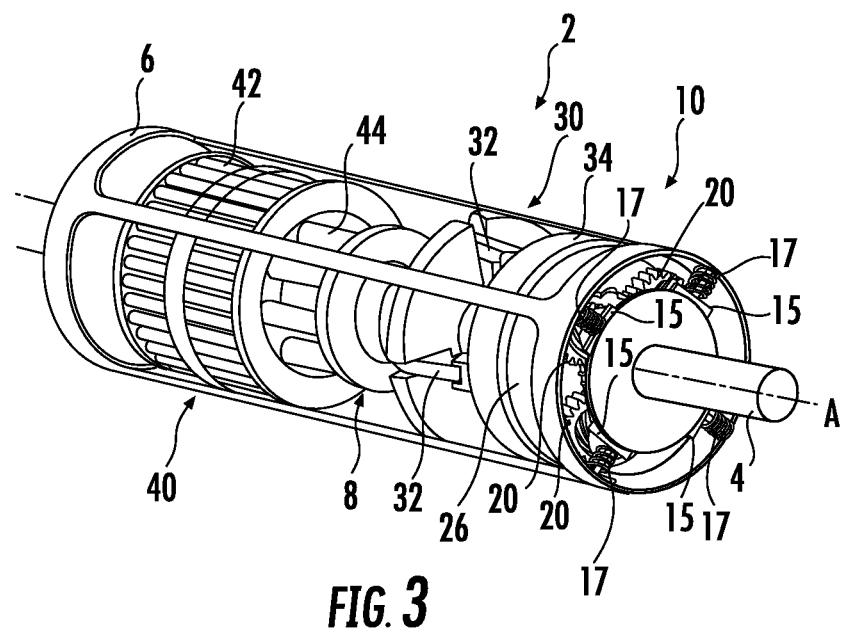
Figure 4:
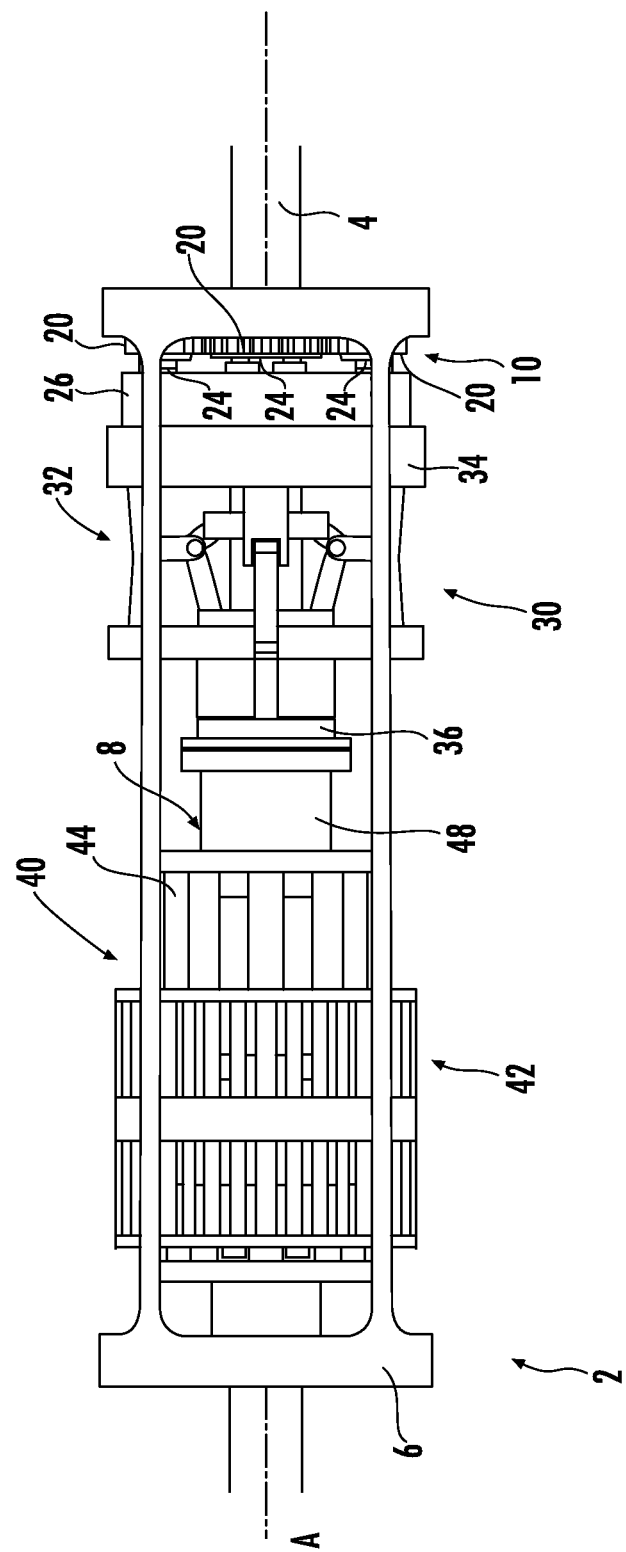
FIG. 4 shows a side view of the self-braking gear shown in FIGS. 2 and 3.

FIGS. 2 and 3 respectively show a perspective view of a self-braking gear 2 according to an exemplary embodiment of the invention, and FIG. 4 shows a side view thereof.

The self-braking gear 2 comprises an input shaft 4 extending along an axis A through the self-braking gear 2. The self-braking gear 2 further comprises an output shaft 6 in the form of a cylindrical cage enclosing the input shaft 4. The axis of the cylindrical cage forming the output shaft 6 is coaxial with the axis A of the input shaft 4.

The input shaft 4 is mechanically connected to a drive or motor, e.g. a drive unit 54 of a people conveyor 50. The output shaft 6 is mechanically connected to a load, such as a chain of conveying elements 52 of a people conveyor 50 (see FIG. 1).

A cycloidal gear drive 40, which is shown on the left side of FIGS. 2, 3, and 4, connects the input shaft 4 to the output shaft 6 of the self-braking gear 2 in order to allow to transmit torque from the input shaft 4 to the output shaft 6. When the input shaft 4 is rotated by the drive or motor, the cycloidal gear drive 40 causes the output shaft 6 to rotate with a rotational speed that is lower than the rotational speed of the input shaft 4.

The cycloidal gear drive 40 comprises braking mechanism 8 which is configured for braking the rotation of the output shaft 6. The structures of the cycloidal gear drive 40 and of the braking mechanism 8 will be discussed in more detail further below with respect to FIG. 8.

The self-braking gear 2 further comprises a planetary gear 10, which is depicted on the right side of FIGS. 2, 3, and 4.

The planetary gear 10 is a self-locking gear, which locks in case no torque is delivered via the input shaft 4, i.e. in case torque would be transferred "in reverse" from the output shaft 6 to the input shaft 4 of the self-braking gear 2. Such a situation may occur when the drive or motor (drive unit 54) does not work or the mechanical connection, e.g. the transmission element 58, between the input shaft 4 and the drive or motor is damaged or destroyed.

In case the planetary gear 10 locks, a movable disk 26, which is arranged in between the planetary gear 10 and the cycloidal gear drive 40, is moved away from the planetary gear 10 towards the cycloidal gear drive 40 (from right to left in FIGS. 2, 3, and 4). This mechanism is described in more detail further below with reference to FIGS. 5 and 6.

A force amplifier 30, which is arranged between said movable disk 26 and the cycloidal gear drive 40 amplifies the force provided by the movement of the movable disk 26 and activates the braking mechanism 8 of the cycloidal gear drive 40 in order to brake the output shaft 6.

Figure 5:
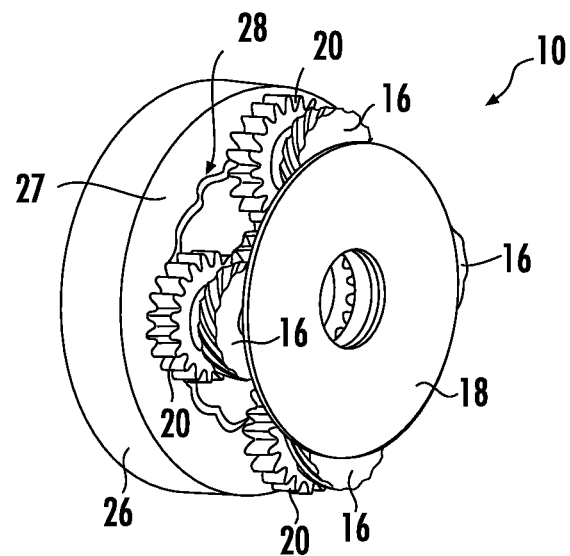
FIG. 5 shows a perspective view of a planetary gear which is employed in the self-braking gear according to an exemplary embodiment of the invention.
Figure 6:
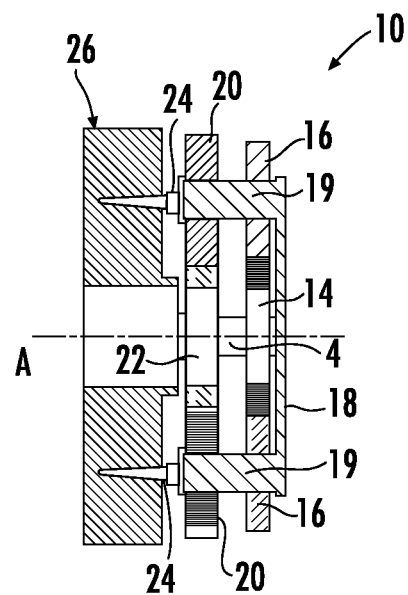
FIG. 6 shows a sectional view of the planetary gear shown in FIG. 5.

FIG. 5 shows a perspective view of the planetary gear 10, and FIG. 6 shows a sectional view thereof along the axis A.

The planetary gear 10 comprises a first sun gear 14. The first sun gear 14 is a spur gear which is fixed to the input shaft 4 (not shown in FIG. 5) so that the first sun gear 14 rotates integrally with the input shaft 4. The first sun gear 14 is in engagement with a plurality of first planets (first planetary spur gears) 16. Each of the first planets 16 is supported by a corresponding axle 19 of a planet carrier 18, which is rotatable with respect to the input shaft 4.

Friction pads 15 (see FIG. 3) are elastically pressed by springs 17 or other elastic elements against the outer periphery of the planet carrier 18. The springs 17 or other elastic elements are supported by the inner surface of the cylindrical cage forming the output shaft 6.

Each axle 19 of the planet carrier 18 further supports a second planet (second planetary spur gear) 20. Each second planet 20 is arranged coaxially with a corresponding first planet 16. The first and second planets 16, 20 may rotate independently of each other, even when supported by the same axle 19.

In the exemplary embodiment shown in FIGS. 2 to 6, the planetary gear 10 comprises four first planets 16 and four second planets 20, respectively. The skilled person, however, will understand that different numbers of first and second planets 16, 20 may be employed as well.

The second planets 20 are in engagement with a second sun gear 22, which is arranged coaxially with the input shaft 4 and the first sun gear 14. The second sun gear 22 may rotate freely with respect to the input shaft 4 and the first sun gear 14.

When the input shaft 4 rotates, the planet carrier 18 rotates around the axis A of the input shaft 4 so that the first and second planets 16, 20 move along a circular orbit. The first and second sun gears 14, 22 are located in the centers of said orbits, respectively. Due to the engagement with the sun gears 14, 22, the first and second planets 16, 20 rotate around their respective axles 19 of the planet carrier 18.

On the side of the second planets 20, which is facing away from the first planets 16 (the left side in FIGS. 4 to 6), a conically formed eccentric shaft 24 is provided on the surface of each of the second planets 20. The eccentric shafts 24 are spaced apart from centers of the second planets 20 in the radial direction. As a result, the eccentric shafts 24 move along an eccentric circular path around the respective axles 19 when the second planets 20 rotate around their respective axles 19. As a result, the eccentric shafts 24 move along a cycloidal path when the planet carrier 18 and the second planets 20 rotate.

A movable plate 26 is arranged next to the second planets 20 on the side facing away from the first planets 16 and the planet carrier 18.

The movable plate 26 is supported so that it is not able to rotate but may be shifted in the axial direction. A groove 28, which is configured for receiving the eccentric shafts 24, is formed on the surface 27 of the movable plate 26 facing towards the second planets 20. The groove 28 is formed along a cycloidal track. In normal driving operation, i.e. when the input shaft 4 is driven so that torque is transmitted from the input shaft 4 to the output shaft 6 and the planetary gear 10 operates as it has been described before; the cycloidal track of the groove 28 coincides with the cycloidal path of the eccentric shafts 24. Thus, in normal driving operation, the eccentric shafts 24 follow the cycloidal track of the groove 2 and there is no mechanical interaction between the eccentric shafts 24 and the movable plate 26.

As mentioned before, the planetary gear 10 is designed as a self-locking gear, i.e. as a planetary gear 10 which locks in case no torque is provided via the input shaft 4. Such a situation may result from a reverse/backward motion of the load, such as a chain of conveying elements 52 of a people conveyor 50, when the provision of a driving force from the drive unit 54 is interrupted, e.g. because the drive unit 54 is stopped or the transmission element 58 is broken (see FIG. 1).

The self-locking properties of the planetary gear 10 may result from friction between the sun gear 14 and the planets 16. In order to enhance the efficiency and reliability of the self-locking properties, the first sun gear 14 and the first planets 16 may have a special self-locking design, e.g. a self-locking design as it has been proposed by A. Kapelevich et al. in "Direct Gear Design", published on Mar. 22, 2013 by CRC Press (ISBN 9781439876183).

When the planetary gear 10 is locked, the eccentric shafts 24 no longer move along the cycloidal path which coincides with the path of the groove 28 formed within the surface 27 of the movable plate 26. Instead, the eccentric shafts 24 are pressed against the sidewalls of the groove 28. This mechanical interaction between the conically formed eccentric shafts 24 and the walls of the groove 28 causes the movable plate 16 to move (shift) in the axial direction away from the planetary gear 10, i.e. to the left side in FIGS. 2 to 6. Said movement of the movable plate 26 results in an input force, which is input to the force amplifier 30 arranged in between the movable plate 26 and the cycloidal gear drive 40.

Figure 7:
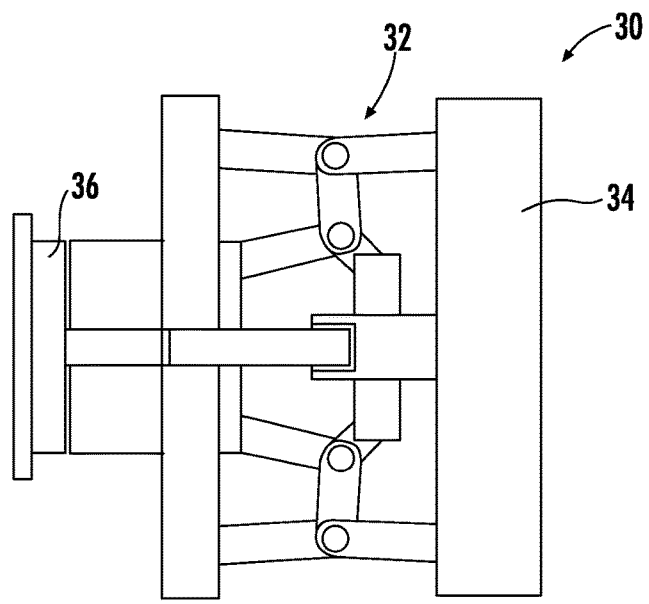
FIG. 7 shows an enlarged view of a force amplifier which is employed in the self-braking gear according to an exemplary embodiment of the invention.

FIG. 7 shows an enlarged view of an exemplary embodiment of the force amplifier 30. The skilled person will understand that alternative types of force amplifiers 30, as they are known in the art, may be employed as well. The force amplifier 30 comprises a plurality of levers 32, which interact in order to amplify an input force, which is input from the movable disk 26 to an input element 34 of the force amplifier 30 by pushing the input element 34 from right to left in the configuration shown in FIG. 7. The levers 32 are in particular arranged in a configuration in which they form a plurality of knee levers. An output element 36 of the force amplifier 30 acts on a braking element 48 of the brake mechanism 8 of the cycloidal gear drive 40. This activates the brake mechanism 8 (see FIG. 4).

Figure 8:
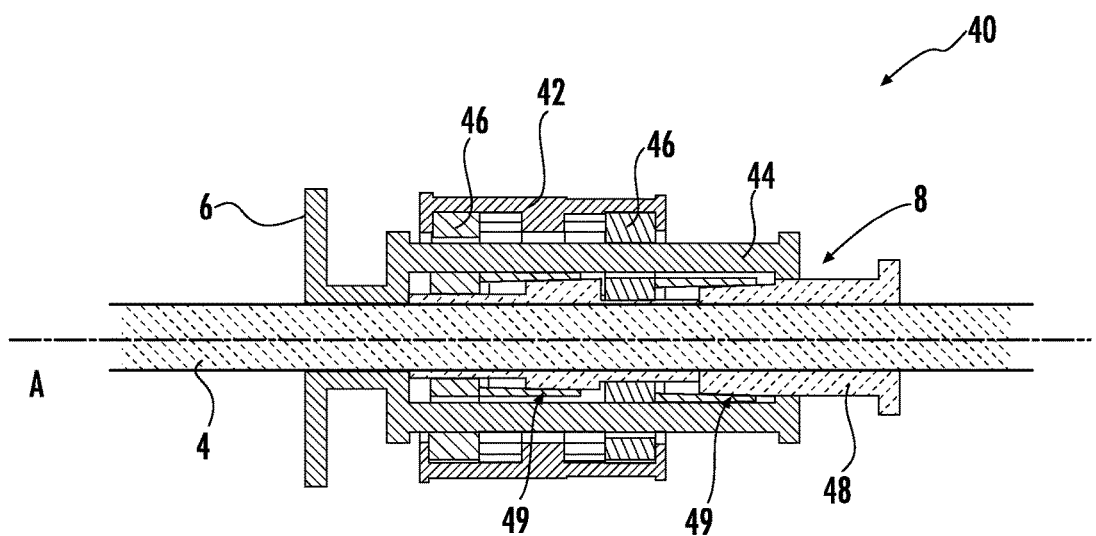
FIG. 8 shows a sectional view of a cycloidal gear drive which is employed in the self-braking gear according to an exemplary embodiment of the invention.

FIG. 8 shows a sectional view of the cycloidal gear drive 40 and the brake mechanism 8.

The cycloidal gear drive 40 comprises two cyclo disks 46 extending parallel to each other orthogonally to the axis A of the input shaft 4. The cyclo disks 46 are connected to the input shaft 4 via an eccentric bearing (not shown). As a result, the cyclo disks 46 perform an eccentric, cycloidal motion, when the input shaft 4 rotates.

The outer contour of each cyclo disk 46 has a cycloidal shape which unrolls on a ring of outer pins (outer ring) 42 when the input shaft 4 rotates.

A plurality of inner pins forming an inner ring 44, which is connected to the output shaft 6, extend parallel to the common axis A of the input and output shafts 4, 6 through openings formed within the cyclo disks 46. When the input shaft 4 rotates, the inner ring 44 and in consequence the output shaft 6 are rotated by the cyclo disks 46 with a rotational speed which is considerably smaller than the rotational speed of the input shaft 4.

The cycloidal gear drive 40 further comprises a braking element 48 which extends parallel to the axis A of the input shaft 4 and which is arranged between the input shaft 4 and the cyclo disks 46 when viewed in the radial direction. The braking element 48 comprises conical outer surfaces 49. The conical outer surfaces 49 are configured to lock the only degree of freedom between the input shaft 4 and the cyclo disks 46 when the braking element 48 is pushed in the axial direction towards the cycloidal gear drive 40, i.e. to the left side in FIGS. 2 to 7, by the output element 36 of the force amplifier 30 when the planetary gear 10 is locked, as it has been described before.

In summary:

In normal driving operation, i.e. when torque is input via the input shaft 4, the planetary gear 10 is not locked. In consequence, the conical eccentric shafts 24 provided on the side surfaces of the second planets 20 follow the cycloidal path of the groove 28 formed within the movable plate 26. As a result, no axial forces are exerted on the movable disk 26, the braking element 48 is not pushed into the cycloidal gear drive 40 and the braking mechanism 8 of the cycloidal gear drive 40 is not activated.

In braking operation, i.e. when no torque is provided via the input shaft 4, the planetary gear 10 locks due to its self-locking properties. In consequence, there is a difference in the rotational speed between the output shaft 6 and the planet carrier 18. The conical eccentric shafts 24 provided on the side surfaces of the second planets 20 no longer follow the cycloidal path of the groove 28 formed within the movable plate 26. As a result, the conical eccentric shafts 24 are pressed against the walls of the groove 28. Due to their conical shape, the eccentric shafts 24 push the movable plate 26 away from the planetary gear 10 towards the cycloidal gear drive 40. This linear movement in the axial direction is amplified by the force amplifier 30. The braking element 48 is pushed into the cycloidal gear drive 40 locking the only degree of freedom between the input shaft 4 and the cyclo disks 46. This locking brakes the output shaft 6, which is connected to the cyclo disks 46 via the inner ring 44.

A number of optional features are set out in the following. These features may be realized in particular embodiments, alone or in combination with any of the other features.

In one embodiment the planetary gear may be configured to lock due to friction when no torque is provided via the input shaft. A planetary gear which locks due to friction is easy to implement at low costs.

In one embodiment at least some gears of the planetary gear, in particular the first sun gear and the first planets, may comprise self-locking tooth profiles in order to lock when no torque is provided via the input shaft. Providing gears with special, self-locking tooth profiles allows to enhance the reliability and efficiency of the self-locking feature.

In one embodiment the planetary gear may comprise a plurality of planets (planetary gears) and an eccentric shaft may be provided on one side of each planet. The eccentric shafts may extend parallel to the axis of the planets. Each of the eccentric shafts may have a conical (tapered) shape, with the thinner side of the conical shape facing away from the planet. The eccentric shafts may be arranged outside the centers of the planets, i.e. offset from the centers of the planets in the radial direction, so that they follow an eccentric cycloidal path when the planets rotate.

In one embodiment the self-braking gear may further comprise a movable disk, which is movable along an axial direction of the input shaft. A groove may be formed on a surface of the movable disk facing the planetary gear. Said groove in particular may be configured to receive the eccentric shafts provided on the planets.

The interaction of the conically shaped eccentric shafts provided on the planets and the groove formed on a surface of the movable disk allows to push the movable plate away from the planetary gear when the planetary gear is locked and the eccentric shafts do not follow the track provided by the groove. This movement of the movable disk may be used to activate the braking mechanism.

In one embodiment the planetary gear may comprise a force amplifier. The force amplifier may be configured to amplify the force, which is applied to the movable disk by the eccentric shafts, and to transfer the amplified force to the braking mechanism. Such a force amplifier allows to provide an increased braking force. This enhances the efficiency and the reliability of the breaking mechanism.

In one embodiment the force amplifier may comprise a plurality of levers which interact in order to amplify the force applied to the movable disk. A plurality of levers allows to realize an efficient and reliable force amplifier.

In one embodiment the self-braking gear may further comprise a cycloidal gear drive, which is configured for transmitting torque from the input shaft to the output shaft. A cycloidal gear drive provides a gear which needs only little space and which allows to provide a large reduction of the rotational speed in combination with a large increase of the torque.

In one embodiment the braking mechanism may be arranged within the cycloidal gear drive. The force amplifier may be located between the movable disk and the cycloidal gear drive. Such an arrangement allows for a very compact configuration which needs only little space and which may be integrated conveniently into the driving shaft of a people conveyor.

In one embodiment the people conveyor may be an escalator. The chain of conveyance elements may be a step chain comprising a plurality of steps. This provides a safe escalator in which an uncontrolled movement of the steps is reliably prevented.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the dependent claims.

REFERENCES 2 self-braking gear
4 input shaft of the self-braking gear
6 rotating shaft/output shaft of the self-braking gear
8 braking mechanism
10 planetary gear
14 first sun gear
15 friction pad
16 first planets
17 spring
18 planet carrier
19 axles of the planet carrier
20 second planets
22 second sun gear
24 eccentric shafts
26 movable plate
27 surface of the movable plate
28 grove in the surface of the movable plate
30 force amplifier
32 levers of the force amplifier
34 input element of the force amplifier
36 output element of the force amplifier
40 cycloidal gear drive
42 outer ring of the cycloidal gear drive
44 inner ring of the cycloidal gear drive
46 cyclo disks
48 braking element
49 conical outer surfaces of the braking element
50 people conveyor
51 landing portions
52 chain of conveyance elements
53 steps
54 drive unit
56 sprocket
58 transmission element
A axis of the input (and output) shaft

What is claimed is:

1. A self-braking gear configured to be employed in a people conveyor, the self-braking gear comprising:
   an input shaft;
   an output shaft;
   a braking mechanism, which is configured for braking the output shaft; and
   a planetary gear which is connected between the input shaft and the output shaft and which is configured to activate the braking mechanism in order to brake the output shaft, when no torque is provided via the input shaft.

2. The self-braking gear according to claim 1, wherein the planetary gear is configured to lock due to friction, when no torque is provided via the input shaft.

3. The self-braking gear according to claim 1, wherein at least some gears (14, 16) of the planetary gear comprise self-locking tooth profiles in order to lock, when no torque is provided via the input shaft.

4. The self-braking gear according to claim 1, wherein the planetary gear comprises a plurality of planets (16, 20), and wherein at least one eccentric shaft having a conical surface is formed on at least one of the planets.

5. The self-braking gear according to claim 4, wherein the at least one eccentric shaft is arranged offset from the center of the at least one planet and/or extends parallel to the rotational axes of the at least one planet.

6. The self-braking gear according to claim 4, further comprising a movable disk, which is movable parallel to an axis of the input shaft, wherein a groove, which is configured for receiving the at least one eccentric shaft, is formed on a surface of the movable disk facing the planetary gear.

7. The self-braking gear according to claim 6, wherein the groove and the at least one eccentric shaft are configured to interact in order to move the movable disk away from the planetary gear when the planetary gear is locked.

8. The self-braking gear according to claim 6 further comprising a force amplifier, which is configured to amplify a force acting on the movable disk.

9. The self-braking gear according to claim 8, wherein the force amplifier comprises a plurality of levers which are configured to interact in order to amplify the force acting on the movable disk.

10. The self-braking gear according to claim 1, further comprising a cycloidal gear drive which is configured to transmit torque from the input shaft to the output shaft.

11. The self-braking gear according to claim 10, wherein the braking mechanism is arranged within the cycloidal gear drive.

* * * * *